United States Patent [19]

Opsvik

[11] Patent Number: 4,897,140
[45] Date of Patent: Jan. 30, 1990

[54] METHOD FOR MAKING A PIPE-SHAPED BODY OF WOOD

[76] Inventor: Peter Opsvik, Hogtunveien 12, Asker, Norway, 1370

[21] Appl. No.: 144,914

[22] Filed: Jan. 13, 1988

Related U.S. Application Data

[63] Continuation-in-part of Ser. No. 865,188, May 19, 1986, abandoned.

[51] Int. Cl.⁴ .............................................. B32B 31/18
[52] U.S. Cl. ..................... 156/250; 156/304.5; 144/347; 144/350; 144/354; 144/355; 312/235 R; 297/118; 297/445
[58] Field of Search ............................ 156/250, 304.5; 144/347, 350, 354, 355; 312/235 R; 297/118, 445

[56] References Cited

U.S. PATENT DOCUMENTS

| | | | |
|---|---|---|---|
| 589,836 | 9/1897 | Koll | 144/347 |
| 1,070,572 | 8/1913 | Wyckoff | 136/162 |
| 1,286,214 | 12/1918 | Bolinder | 144/355 |
| 2,430,241 | 11/1947 | Nicholas | 312/235 R |
| 3,371,963 | 3/1968 | Weller | 297/445 |
| 3,575,465 | 4/1971 | Dolby | 297/118 |
| 4,522,006 | 6/1985 | Plikuhn | 144/350 |

Primary Examiner—Caleb Weston
Attorney, Agent, or Firm—Darby & Darby

[57] ABSTRACT

This invention relates to an improvement in the manufacture of pipe-shaped bodies of wood composed of a plurality of longitudinally straight but transversely curved wood-staves, the longitudinal edges thereof being provided with a tongue and groove configuration and being glued together, while being mounted in a sidewise engagement in a craddlelike mounting means. The pipe-shaped bodies are later processed by milling, grinding or polishing internally and externally, whereafter the pre-made cylindrical, hollow bodies are cut or cut out to form one or more furnitures, for example chairs, cabinets or the like. Preferred embodiments of the pipe-shaped body are cut from a pipe-shaped blank so as to form one or more pairs of similar pieces of furniture, the cutting line between said pair or pairs of furniture following a symmetrical line to give optimum utilization of the pipe-shaped material. The invention also relates to the use of such pipe-shaped bodies as combined sculptures and furnitures.

12 Claims, 6 Drawing Sheets

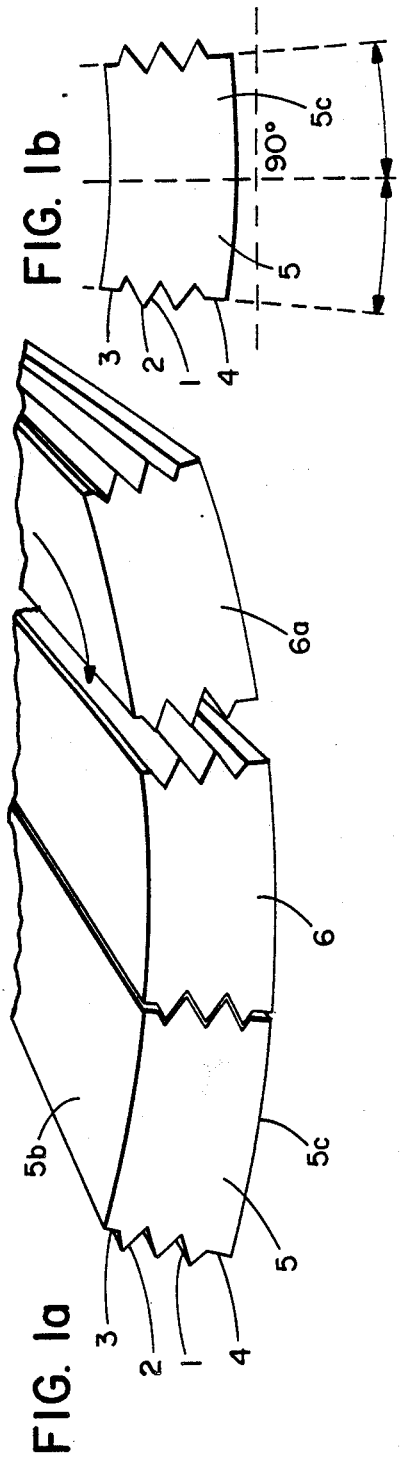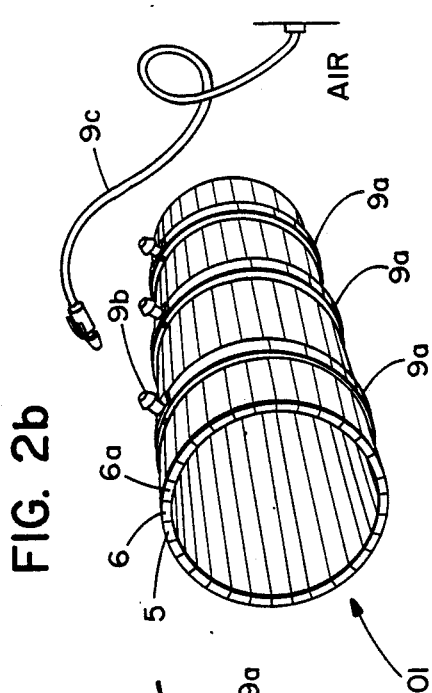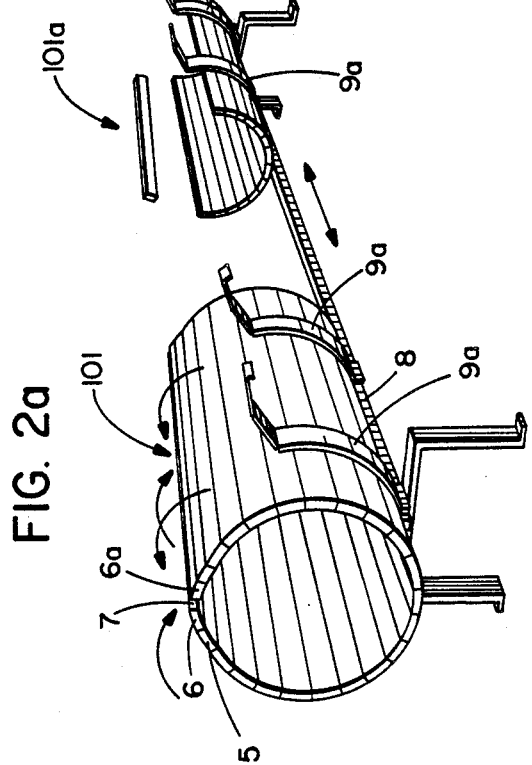

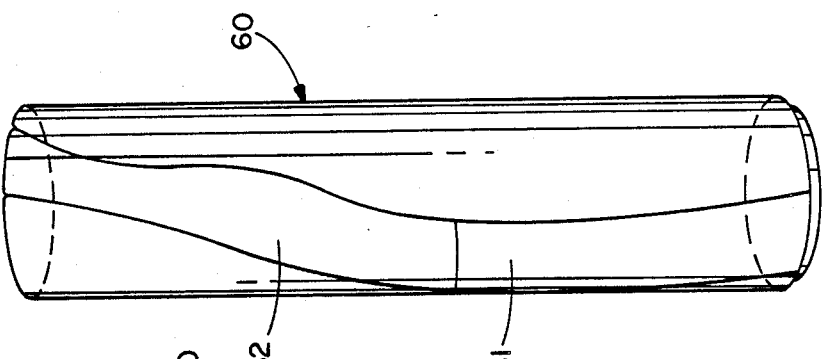
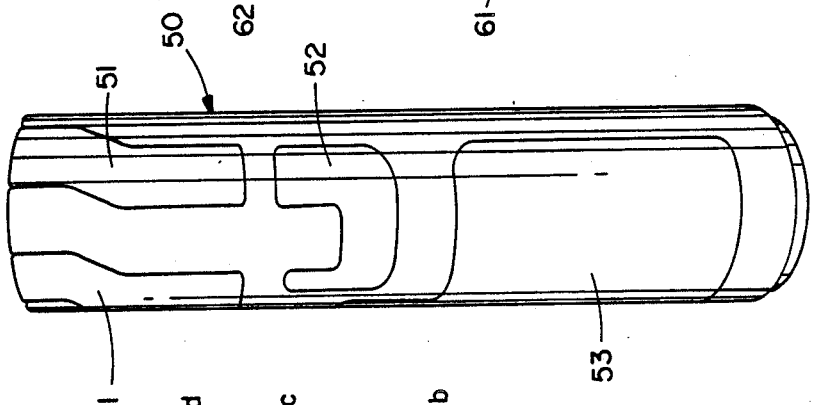
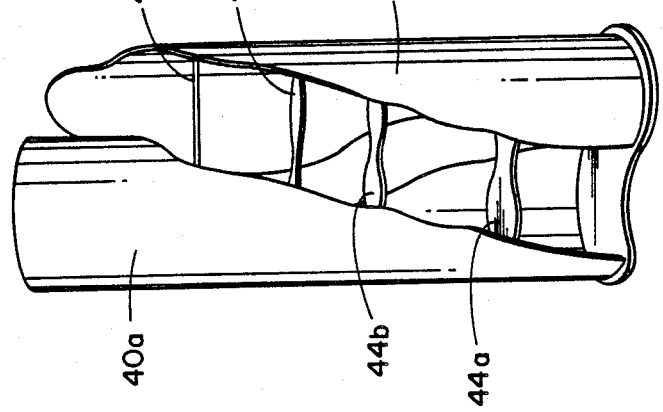
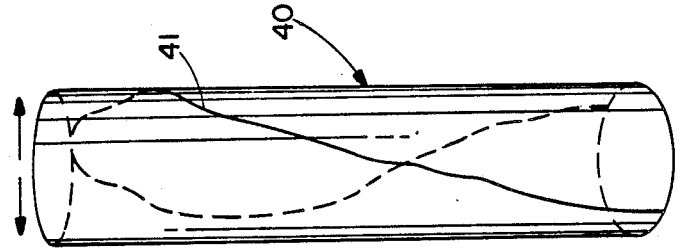

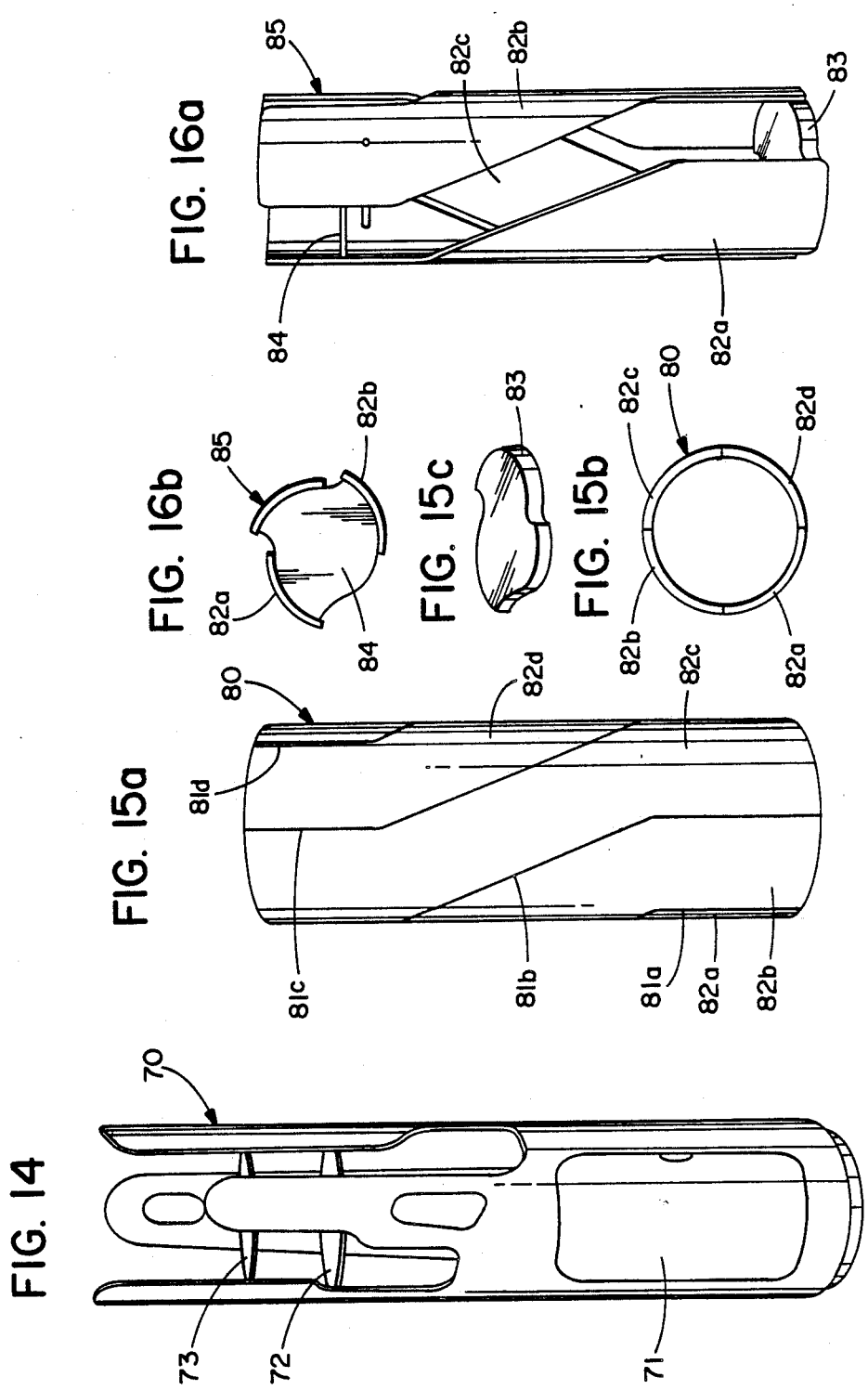

METHOD FOR MAKING A PIPE-SHAPED BODY OF WOOD

The present invention is a continuation-in-part of my previous U.S. application Ser. No. 865188 filed May 19, 1986 now abandoned.

FIELD OF THE INVENTION

The present invention relates to a method for manufacturing a pipe-shaped body of wood having a substantially annular section.

The present invention also relates to an improved use related to such pipe-shaped bodies of wood composed of a plurality of wood-staves.

BACKGROUND OF THE INVENTION

Wood is a living material in which expanding and contracting movements take place in pace with the surrounding air humidity and temperature. It is therefore of great importance that wood to be used for the manufacturing of furniture, be dried to a humidity content of 8 to 10%.

Especially in connection with the manufacturing of pipe-shaped bodies to be used for furniture, the wood-staves must be given such a physical shape and be assembled in such a manner that the pipe-shaped body as a whole must be able to withstand these environmentally dependant oscillations. Besides, since the pipe-shaped body used as furniture will expose both its external and internal surfaces, it is necessary for the achievment of a pleasant and attractive appearance thereof, to avoid any offset between the staves including gaps, distensions and sprawls.

Besides, a furniture design which is based upon the use of a pipe-shaped body of this kind, will not allow the use of reinforcing straps which are clamped around the wood-stave cylinder. Due to the hygroscopic properties of wood material a possible reinforcement means may be tolerated, which embodies inner, invisible means of the same living wood material and with the same wood structure.

From U.S. Pat. No. 1,070,572 (S. F. Wyckoff) there is known an improved form of interlocking joint especially adapted for use in sectional wooden columns or sectional wooden conduits and the like, where it is desirable to have the meeting edges of comparatively long sections interlocked in as simple and inexpensive a manner as possible.

However, since the known pipe-shaped bodies of wood are to be used as columns or conduits, the thickness of each stave is relatively large compared to the overall diameter of the pipe, the large thickness of the staves also being necessary due to the shape of the interlocking grooves and tongues. If the embodiment illustrated in said U.S. Patent Specification is compared to a cylinder having a diameter of for example 62 cm, the known wood-stave interlocking technique would require a stave thickness of 10 cm, which is five times as much as the present technique advising a pipe wall thickness of approximately 2 cm.

Further, the known technique requires very large tongues and grooves, involving a considerable width of each stave, and a considerable amount of wood to be removed from each side edge of the staves, which means a heavy loss of blank material.

This known manufacturing technique would be very unfavourable in connection with the production of furniture, since it requires an unfavourable utilization of materials and time, which is in contrary to effective furniture production in which a rational utilization of time and raw material is prevalent.

If nevertheless this known technique according to U.S. Pat. No. 1,070,572 should be used in furniture production, the required smaller material thickness and accordingly smaller grooves and tongues would involve that only the highest quality of material could be used, i.e. stave material being substantially free from knots, since the smaller material thickness and consequently smaller taps would make the latter very sensitive to breakage during the mounting of the staves.

Further, the mounting of the individual staves to a complete cylindrical body is, due to the arrangement of the grooves and the tongues at an angle to each other, restricted to the staves or sections being slid relative to each other after placing one section adjacent the end of the other section and with its tongue and groove in register with the groove and tongue respectively of the other section. This sliding of the staves relative to each other for the overall mounting thereof to a finished pipe is time consuming as compared to placing a plurality of staves side by side in a cradle for sidewise mounting thereof. The longitudinal sliding of the staves for the interlocking thereof, as suggested by the known technique, would also give an unfavourable utilization of the effect of any glue coated on the side edges of the staves, and consequently a large, unnecessary expenditure of not only glue, but also time and material.

Also as regards any later cutting of the conduits according to U.S. Pat. No. 1,070,572, this known technique would render a large possibility of uneven assembly between the staves due to the hygroscopic properties of the wood. Besides, the known cylinder or conduit includes a multiple of flat outer surfaces, i.e. an outer polygonal circumference. If said flat outer faces should be ground to an overall round outer surface, the outer tap or tongue would be weakened or even damaged, thereby considerably reducing the value and effectiveness of the tongue and groove interlocking system.

Therefore the conduit according to U.S. Pat. No. 1,070,572 can not provide a cylinder which can be cut in any direction and still have a stable configuration and still expose an excellent quality on any surface, both inwardly and outwardly.

From Australian patent specification No. 101195 there are known wood-stave pipes which are reinforced by a spiral winding of wire, in which the pipe barrel or body composed of a plurality of staves is surrounded by a wire reinforcement in helical formation with an interposed tape or ribbon.

Industrial Canada, Jun. 1934, page 59, "Canadian Wood-Pipe & Tanks" describes a "Canadian" Butt Jount including a double-tongue-and-groove construction having twice the strength of an old-type joint.

In British patent specification No. 25380/1904 there is disclosed the construction of hollow columns of regular or irregular taper, such for instance as is called for in the classic order of architecture, and it consists in providing the staves, whereof these columns are formed, with interlocking tongues and grooves, the said interlocking devices being parallel with the edges of the staves and integral therewith.

In all the publications mentioned above, the wood-stave pipes are used as pipes only or as columns extending their full length, but no hint or indication is found for using such wood-stave pipes for furniture, let alone for using such bodies as combined furnitures and sculptures. Neither do these publications give any instructions for how to manufacture a pipe-shaped body of wood having a substantially annular section in an effective and time-consuming manner for thereby providing a cylinder which can be cut in any direction and still by devoid of gaps, distensions or sprawls, while exposing the same smooth and pleasent appearence both as regards its inner and outer surfaces.

U.S. Pat. No. 3,371,963 (Weller) discloses a procedure for convolutely winding multi-ply paper tubes with flat size and rounded corners, and from these paper tubes having parallel sides with interwining rounded corners, there are cut furniture parts.

U.S. Pat. No. 3,722,953 (Hull) relates to chairs, bed, sofas, tables, bookshelves, and other articles of furniture, which are formed of arcuate and cylindrical members, which might be derived, for example, by cutting cardboard tubes into appropriate shapes.

According to these references products are prepared from forms or moulds including square channels with rounded corners, possibly including cylinders which are moulded from various homogenaous masses, or a mould comprising thin layers on top of each other for procuring a sufficiently strong blank material. However, no hints are given of how wooden staves can be assembled in a manner bringing forth smooth and even surfaces on both sides of the cylinder walls.

From an aestethic point of view these products must often be further treated by means of other materials, especially in the area of the edges, and possibly be given a surface treatment to cover or hide the homogeneous mass.

In fact the present invention is primarily a further development of barrel production, but the present method has deviated from this known cooper handcraft technique by paving new ways, thinking in novel combinations, disregarding experienced furniture craftmen's warnings, and by using months of experiments to arrive at a useful combination of design and technique. Thus, if it had been so simple and possibly straight forward to just use the previously known knowledge from the cooper handcraft including the assembly of longitudinally bent staves with varying widths along their lengths but reinforced by means of barrel straps, this previously known technique would no doubt have been discussed in the publications referred to in the preamble of the present specification.

SUMMARY OF THE INVENTION

The main object of the invention is to improve the manufacturing of a pipe-shaped body of wood having a substantially annular section, as well as to improve the use of such pipe-shaped bodies of wood, i.e. to bring this technique a further step forward, especially within the furniture industry.

An important object of the present invention is thus to provide pipe-shaped bodies of wood composed of a plurality of wood-staves in which the cylinder obtains a substantially round section, so as to utilize the inherent tension forces of the circle to a largest possible degree.

Another object of the present invention is to provide a pipe-shaped body of wood composed of a plurality of wood-staves in which both the inwardly and outwardly of surfaces are smooth. In other words the requirements for quality should be the same for both surfaces of the cylinder, which is in contrary to commonly known wood cylinders or conduits or barrels in which only the outer surface is visible.

Still another object of the present invention is to provide a method for manufacturing such wooden cylinders with a reduced expenditure of material, and at the same time giving instructions for how to treat the cylinders by means of milling, grinding or polishing internally and externally.

Yet another object of the present invention is to provide a wooden cylinder composed of wood-staves, which is stable as regards form and shape also after having been cut to various pieces of furniture, there being no need for straps or other reinforcing means to keep the cut parts or sections of the cylinder together.

A further object of the present invention is to give instructions for how the individual wood-staves are assembled by preparing the edges of the staves with appropriate tongues and grooves and coating said grooves and tongues with glue before the assembly thereof.

An object of the present invention also resides in a method of assembling the wood-staves so that the glue applied on the tongues and grooves will be maintained thereon during the assembly of said staves, thereby providing a greater gluing efficiency and avoiding a large consumption of glue.

A further object of the present invention is to give instructions for a method of assembling said wood-staves to a cylinder in which the risk of damaging the tongues and grooves during assembly of the staves is reduced to a minimum.

A still further object of the invention is to provide an optimum utilization of the assembled wood cylinder, which means that the cylinder composed of a plurality of wood-staves must tolerate cutting in all directions and still have a stable form and the same excellent qualities on any surface.

Also, the present invention has for an object to pave the way for furniture products which, regarding structure and functional appearance, differ from previously known furniture products.

The above objects are achieved in a method for manufacturing a pipe-shaped body of wood having a substantially annular section, which according to the invention comprises the steps of:

(a) providing a plurality of substantially straight wooden staves of approximately equal length and of a predetermined width and thickness, (b) preparing each stave so as to bring forth an inner longitudinal surface which is transversely curved, and an outer longitudinal surface which is correspondingly transversely curved, said curvatures being adapted to the number of staves making up a composed pipe-shaped body of a predetermined diameter, (c) preparing the longitudinal side edges of each stave so as to provide oppositely slanting edge portions on either side edge, said slanting portions when notionally prolonged meeting in the center of the completed pipe to be manufactured, (d) said side edges of each stave also being provided with substantially (waved-shaped) undulating mutually opposite grooves and tongues, (e) coating said prepared side edges of each stave with an adhesive, (f) placing said prepared staves in a cradle-like mounting means in which said edges of each stave are brought in sidewise engagement with the side edges of an adjacent stave so as to form a round hollow pipe, the final stave constituting the completion of the hollow pipe being brought in position by forcing the second last stave and its next adjacent stave so far apart that the narrow space defined therebetween becomes large enough for the final stave to be snapped thereinto upon release of said force, (g) clamping said assembled staves to stabilize the cylinder and allow the adhesive to cure, (h) releasing said finished pipe-shaped body for external and internal prosessing, and (i) cutting said finished cylinder to form one or more funitures, for example chairs, cabinets or the like.

It should be noted that the undulating mutually opposite grooves and tongues could be V-shaped or U-shaped, but generally adapted for sidewise entering of the neighbour staves.

The adhesive coat applied to the side edges of each stave could be any type of glue prepared for holding together wood.

In view of the above there are also according to the invention given instructions for improvement relating to the use of pipe-shaped bodies of wood composed of a plurality of wood-staves, in which the longitudinal edges thereof have tongue and groove configuration and are glued together, and in which the pipe-shaped bodies are prosessed by milling, grinding or polishing internally and externally, the improvement residing in that the pre-made cylindrical, hollow bodies are cut or cut out to form one or more furnitures, for example chairs, cabinets or the like, the body over a certain length thereof being cut so as to form substantially similar pieces of furniture, the cutting line or lines between said pieces of furniture being arranged so as to give optimum utilization of the material in the pipe-shaped body.

This "symmetrical" cutting is favourable in connection with the production of so-called chairs carved from a large section of log, in which the blanks for said chairs each have a cylindrical portion forming the lower part of the chair, said cylindrical portion merging into the support for the back which takes the form of generally a half cylinder. In a further version of such a chair the chair can take the form of a partly closed hand with an erected thumb, the thumb of the one chair corresponding approximately to the width of the seat opening of the "paired" chair blank.

The invention is further described reference to the drawings which illustrate the realization of the present invention and various embodiments thereof.

BRIEF DESCRIPTION OF THE DRAWINGS

FIG. 1a illustrates two staves which are to be joined for constituting a part of the wall of a pipe-shaped body.

FIG. 1b is a fractional view of a single stave to be joined with similar staves.

FIG. 2a illustrates two steps in the present method of assembling a plurality of wood-staves to pipe-shaped bodies.

FIG. 2b illustrates a further step in the present method of assembling a plurality of wood-staves to a cylinder, the cylinder here being in its clamped and adhesive-curing stages.

FIG. 10 is a perspective view of a pipe-shaped body, prepared for being cut to a special embodiment of an open cabinet or rack.

FIG. 11 shows the finished rack cut from the blank of FIG. 10.

FIG. 12 illustrates a further example of a cabinet manufactured in accordance with the invention.

FIG. 13 illustrates another example of a cabinet manufactured in accordance with the invention.

FIG. 14 illustrates an embodiment of a combined cabinet and rack.

FIGS. 15a and 15b illustrate a side view and a top view respectively, of a pipe-shaped body prepared for being cut to a special embodiment of an open closet, the blank being prepared with four simular cuttings.

FIG. 15c is a perspective view of a special bottom piece to be included in the finished closet prepared from the blank of FIG. 15a.

FIGS. 16a and 16b are a perspective view and a top view respectively, including three of the pieces of the cut blank of FIG. 15a.

FIGS. 17a and 17b illustrate a further embodiment of th chair of FIGS. 5, 6 and 7, in which the chair is made like a partly closed hand with a raised thumb.

FIG. 18a is a side view of a further embodiment of a cabinet.

FIG. 18b is a top view of the same cabinet.

FIG. 19a is a side view of still another embodiment of a cabinet.

FIG. 19b is a top view of the same cabinet.

DESCRIPTION OF THE INVENTION

Figure 5:
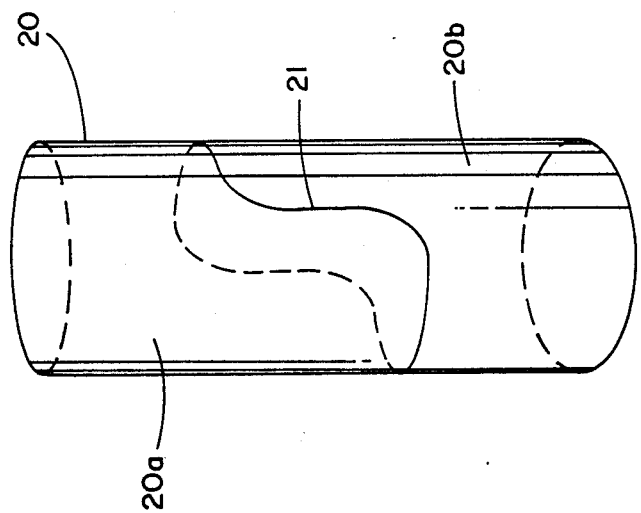
FIG. 5 is a perspective view of a pipe-shaped body, prepared for being cut to a pair of similar chairs.

In FIG. 1a there are illustrated tree staves 5, 6 and 6a, respectively, the longitudinal edges thereof each being provided with grooves 1 and tongues 2 for making a tongue-and-groove connection when positioned side by side. The longitudinal edges of the staves 5, 6 and 6a are also provided with edge portions 3, 4 which normally can have a size and shape adapted to the desired radius of curvature for the pipe-shaped body to be formed. In the illustrated example of FIGS. 1a and 1b the grooves 1 and tongues 2 are primarily V-shaped, but it is to be understood that also other shapes are possible, for example U-shape, said alternative shapes being adapted for side by side assembly of the individual staves to a cylinder, which will be further described in the following.

It is to be understood that the individual staves 5, 6 and 6a can have a length ranging between 200 cm and 40 cm, depending on the field of application, whereas the thickness of each stave could be approximately 20 mm. In FIG. 1b it is illustrated that the stave is provided with longitudinal side edges slanting at approximately 6° related to a central plane 5a through the longitudinal extension thereof.

A method for manufacturing a pipe-shaped body of wood having a substantially annular section is described with reference to FIGS. 1a, 1b, 2a and 2b.

A first step includes the provision of a plurality of substantially straight wood-staves 5, 6, 6a of approximately equal length, for example in the range from 40 cm to 200 cm or more, for example up to 400 cm, the thickness of each stave being approximately about 2 cm, whereas the width will depend on the diameter of the finished cylinder. An appropriate diameter may be in the range of 40 to 80 cm, preferably approximately 62 cm.

The next step is to prepare each stave 5, 6, 6a so as to bring forth an inner longitudinal surface 5b which is transversely curved, as well as an outer longitudinal surface 5c which is correspondingly transversely curved, said curvatures being adapted to the number of staves making up a composed pipe-shaped body 101 of predetermined diameter.

Simultaneously with the preparation of the curved surfaces 5b and 5c, or in an appropriate association therewith, the longitudinal side edges of each stave are prepared so as to provide oppositely slanting edge portions on either side edge, said slanting portions when extended along an imaginary line meeting in the center of the completed pipe to be manufactured.

It is to be noted that the slanting side edges of each stave are also provided with substantially undulating mutually opposite grooves and tongues, 1 and 2, respectively, as illustrated in FIGS. 1a and 1b, the edge portions 3, 4 indicating the slanted relationship to the longitudinal center plane 5a of each stave.

When having been provided with said side edges including the grooves 1, the tongues 2, as well as the edge portions 3, 4, each stave will be coated with an adhesive in said area of the side edges, whereafter said prepared staves 5, 6, 6a etc., will be placed in a craddle-like mounting means 8, in which said slanting edges of each stave is brought in side-wise engagement with the corresponding side edges of an adjacent stave, so as to form a round hollow pipe 101, said mounting steps being illustrated as a half-way finished assembly 101a to the right of FIG. 2a, whereas a similar assembly 101 is close to its termination to the left of FIG. 2a.

It is to be understood that the mounting means 8 may comprise a plurality of clamping means 9a, in FIG. 2a a total number of for example four, a pair of said clamping means being used for each assembly 101a and 101, respectively. As the clamping means can be made slideable along the mounting means, several assemblies can be prepared at the same time, or possibly assemblies of greater or lesser lengths.

It should be noted that the final stave, in FIG. 2a for example the stave 6a, constituting the completion of the hollow pipe 101, is brought in position by forcing the second to last stave, here the stave 6 and its next adjacent stave, here the stave 5, so far appart that the narrow space defined therebetween becomes large enough for the final stave 6 or 6a to be snapped thereinto upon release of said force.

After the completion of the cylinder 101, the assembled staves will be kept in its round state by means of clamping means 9a and in this clamped position they are allowed to stabilize the cylindric form by allowing the adhesive to cure.

In FIG. 2b there are illustrated three clamping means 9a taking the form of housings which are assembled around the outer circumference of said assembled pipe-shaped body 101 at spaced intervals, said housings being provided with inlet valves 9b through which they are filled with air through an appropriate air supply means 9c to sufficient pressure to exercise there clamping function. It is to be understood that the length of the assembly 101 may have a larger length than the assembly 101a and 101 illustrated in FIG. 2a, with additional clamping means.

After the lapse of an appropriate curing time as regards the adhesive, the clamping means 9a are released and the finished composed wood-stave containing cylinder 101 then constitutes a self supported cylindrical body which is ready for later external and internal processing.

Figure 3:
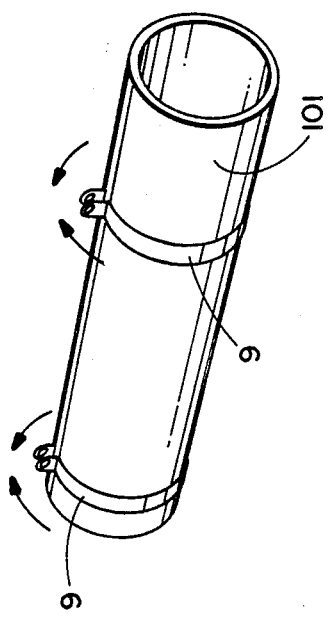
FIG. 3 illustrates the pipe-shaped body composed of a plurality of wood-staves glued together along their longitudinal edges.

It is to be understood that the clamping means does not necessarily have to include air hoses as indicated in FIG. 2b, but might also be composed of straps, for example as indicated in FIG. 3, which are assembled around the outer circumference of the assembled pipe-shaped body 101, the straps 9 being fastened by means of bolts and nuts or by means of a not illustrated bend-over releasable lock to tighten each strap in clamping position.

Figure 4:
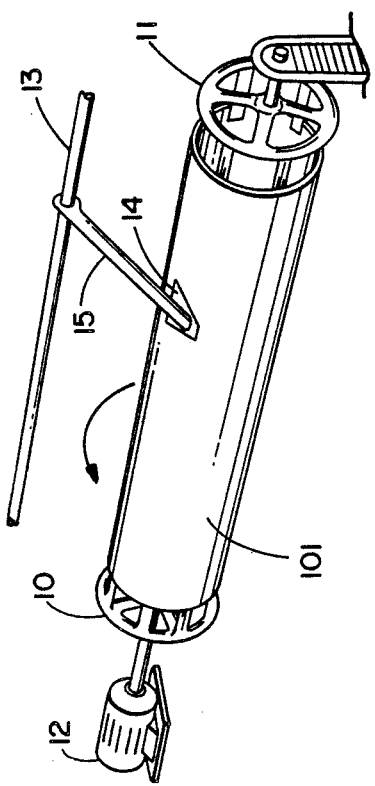
FIG. 4 illustrates diagrammatically the pipe-shaped body during the grinding and polishing operation.

After the glue has cured, the clamping straps 9a, or 9, are removed, whereafter the body 101 is mounted between holding means 10, 11 for further processing, as shown in FIG. 4. The body 101 is rotated for example by means of a motor 12. A wood processing tool 14 can through an arm 15 be slideably connected to a supporting rail 13, such that the processing tool 14 can be guided along the full length of the body 101.

The processing tool 14 can for example be constituted by conventional wood processing equipment, for example equipment for milling, grinding or polishing, or the like. The processing of the inside of the body 101 can take place by means of for example a rotating milling tool which can be passed through the body 101, or a processing tool which is positioned stationary inside the body 101 for the processing of the inner wall when the body 101 is rotating.

After the pipe-shaped body has been manufactured in this manner, the body can according to the invention be cut or cut out to form one or more furnitures, for example chairs, cabinets, closets or the like.

By the above described method for manufacturing pipe-shaped body of wood having a substantially annular section, there is provided a stable cylinder composed of wood-staves which are still hygroscopically active. In spite of this living material which will move in pace with the ambient moisture contents and the temperature, there is provided a high quality furniture blank from various types of wood, without spoiling the structure and the appearance of natural wood, the cylinder form in an effective manner being used in furniture design. Aside from being a living material, wood which has been prepared and polished takes a pleasant appearance, it gives a good touch, and for most people it develops an attractive fragrance.

The cylinder shape or parts thereof have previously entailed great practical problems, a large expenditure of material, as well as large working expenses.

In the embodiment illustrated in FIGS. 2a and 2b, there might appropriately be used, for example, thirty staves for arriving at a cylinder having a diameter of approximately 62 cm, giving a circumference of approximately 194 cm which divided by thirty staves will give an average width for each stave of approximately 6.5 cm.

Both the inner side and the outer side of each stave must be prepared so as to obtain a curvature which is accurately adapted to the final diameter of the cylinder. The sloping edges of each stave should also have an accurate value so as to make up for 360 degrees for the completely round cylinder and the diameter thereof.

It should further be understood that if the slanting angle of the side edges of each stave is kept constant, the width of each stave must be adapted to the desired final diameter of the composed cylinder.

Alternatively, if the width of each stave is kept constant, the sloping angle of the side edges of each stave must be adjusted depending on the diameter of the finished cylinder.

Finally, it should be noted that the thickness of each stave could be smaller or larger than 20 mm, and the length of each stave could also be varied beyond the above range of 40 to 400 cm.

By the above method there is also achieved a complete cylinder shape which in its structure utilizes the inherent tension forces in the circle to a largest possible degree, and the choice of dimension and configuration of the grooves and tongues will contribute to the most effective utilization of blank material. This is of importance especially in connection with expensive hardwood material, for example ash and mahogany, but has also relevance to soft wood or coniferous wood material.

The above method also provides an effective industrial and handcraft related method, which allows a furniture designer to produce or cut furnitures from a living cylinder having an appearance and structural likeness of a whole wood cylinder, whilst coping with the most heavy quality requirements as regards the inner and outer surfaces, as well as optimum use of time and raw material. These requirements also include stability as regards form and a minimum use of possible reinforcements, possibly only internal reinforcements which have been cut from the same type of wood cylinders.

Figure 6:
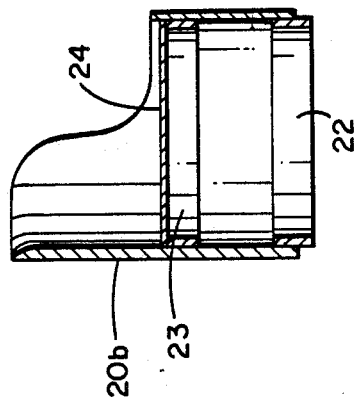
FIG. 6 is a section through one of the chairs prepared from the blank of FIG. 5.
Figure 7:
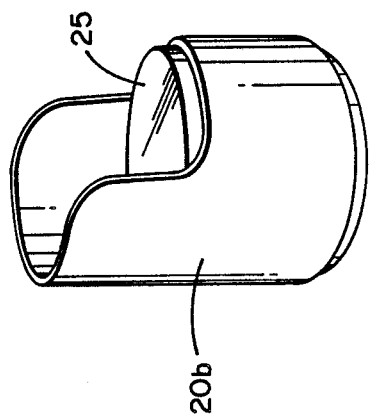
FIG. 7 illustrates the finished chair cut from the body of FIG. 5 and provided with a padding.

In FIGS. 5 to 7 there is illustrated an example of how an elongated pipe-shaped body has been used for cutting out a pair of "carved chairs". The pipe-shaped body 20 has here over a certain length, been cut so as to form a pair of similar pieces of furniture, 20a and 20b, respectively, the cutting line 21 between said pair of furniture being a symmetrical line to give optimum utilization of the material.

In FIG. 6 one of the pieces of furniture 20b has been provided with a lower ring 22 forming the base of the chair 20b, as well as an upper ring 23 constituting a support for a seat 24. In FIG. 7 the seat 24 supports a padding 25.

The rings 22 and 23 can be cut from the same hollow body 20 as the chair blanks 20a and 20b, but are later split to obtain a reduced diameter by removing one or more small pieces of the wood rings. The rings 22 and 23 with reduced diameter are attached to the inner wall of the chair as illustrated in FIG. 6, for example by means of screws.

By this use of a pipe-shaped body there is not only achieved an optimum utilization of the material, but there is also achieved a light but steady "carved chair".

Figure 9:
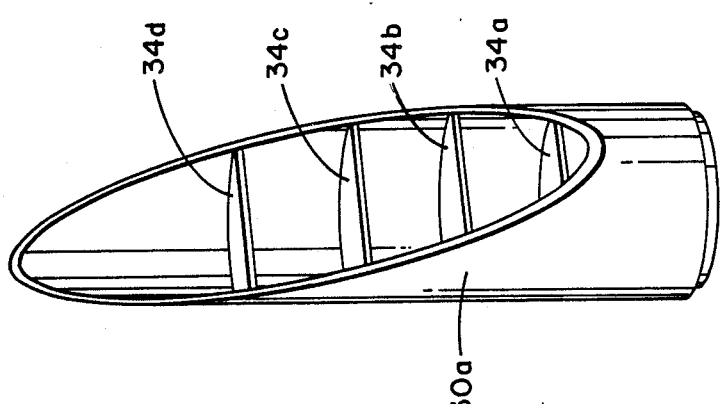
FIG. 9 illustrates one of the finished cabinets or book shelves cut from the blank of FIG. 8.
Figure 8:
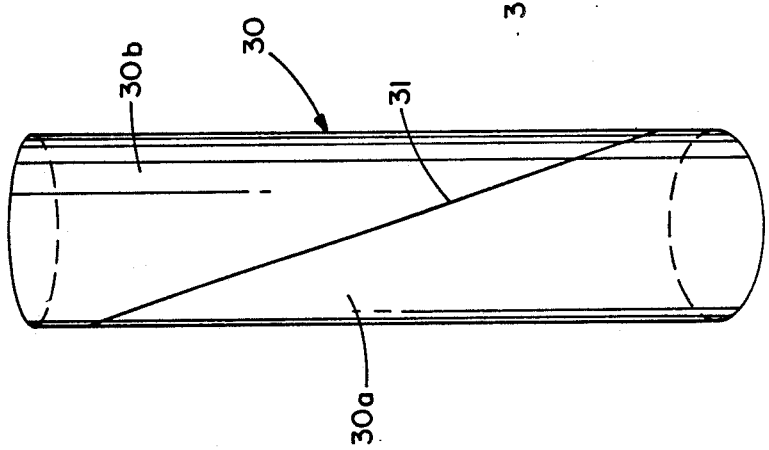
FIG. 8 is a perspective view of a pipe-shaped body, prepared for being cut to a pair of similar cabinets or book shelves.

FIGS. 8 and 9 illustrate an example of a cabinet or bookshelf manufactured in accordance with the present invention.

The pipe-shaped body 30 is cut along a cutting line 31 to give two similar furniture blanks, 30a and 30b, respectively. FIG. 9 illustrates the finished cabinet or book shelf prepared from one of the blanks 30a of FIG. 8, the furniture blank 30a, here being provided with a bottom supporting ring 32 as well as shelves 34a, 34b, 34c and 34d arranged at suitable intervals on not illustrated supports attached to the inner wall of the blank 30a.

FIGS. 10 and 11 illustrate another example of a cabinet manufacture in accordance with the invention.

Here, the pipe-shaped body 40 is cut along two cutting lines 41a and 41b, so as to form two similar shells 40a and 40b, which are placed somewhat apart on a support 42, for carrying a plurality of shelves 44a, 44b, 44c and 44d therebetween.

FIG. 12 illustrates another embodiment of a cabinet 50 with various door configurations 51, 52 and 53, all of which is cut from a pipe-shaped hollow body. It is to be understood that behind the doors, there are provided suitable shelves or drawers.

FIG. 13 illustrates yet another embodiment of a cabinet 60, having cut out, elongated and curved doors 61 and 62.

FIG. 14 illustrates still another embodiment according to the present invention, the pipe-shaped body 70 here being cut so as to form a combined cabinet and rack, the body 70 being provided with at least one door 71 and several shelves 72 and 73. Of course, the body 71 illustrated in FIG. 14 can be a part cut from a longer pipe-shaped body, the remaining part thereof constituting a second body of approximately similar shape as the body 71.

FIGS. 15a and 15b are side view and top view, respectively, of pipe-shaped body 80 which is cut along four cutting lines 81a, 81b, 81c and 81d, respectively, so as to form four similar shells 82a, 82b, 82c and 82d.

Three of the similar shells, for example 82a, 82b and 82c are, after the cutting along the four cutting lines 81a, 81b, 81c and 81d, put together with a bottom piece 83, see FIG. 15c, as well as a shelf piece 84, see FIGS. 16a and 16b, so as to form an open closet or cabinet 85. The fourth shell 82d, can be used with the next set of similary cut shells of the next pipe-shaped blank to be prepared for such cabinets or closets.

FIG. 17a is a perspective view of a prepared blank 90 of a single round pipe-shaped body, for the forming of two "thumb"-chair 90a and 90b, wherein the "thumb" position 91a of the one chair 90a corresponds approximately to the width of the seat opening 92b of the other chair 90b. It should be noted that the template of the first chair blank has been somewhat displaced circumferentially and been longitudinally turned in the opposite direction, relative to the other chair blank. FIG. 17b shows the finished "thumb"- or "finger"-chair 90b, looking like a half-open hand, and including a seat support with a seat padding 93a, and a back rest padding 94.

FIGS. 18 and 19 illustrate further the embodiments of cabinets, the cabinet 95 for example being provided with a semicircular front 95a and a flat rear wall 95b, as illustrated at the bottom of FIG. 18. The cabinet 96 can for example be provided with a semicircular front 96a and two flat rear wall portions 96b and 96c the latter walls 96b and 96c making an approximately right angle relative to each other. It should, however, be understood that the cabinets 95 and 96 can be circular in form, as well as having flat or acute rear wall portions, so as to be placed against a wall or in a corner of a room.

In one exemplary embodiment of the invention, the cutting path for obtaining the carved furniture pieces of the invention is provided by first plotting the desired path on one or more paper templates, which are then fastened to the prepared pipe-shaped bodies for direct cutting, for example by hand-operated motor-driven cutting tools.

I claim:

1. A method for manufacturing furniture products from a substantially annular pipe-shaped body made of a number of wood staves, comprising the steps of:

selecting a number of substantially straight wood staves having substantially parallel longitudinal edges, substantially parallel faces, and a predetermined length, width and thickness, furnishing each said face with substantially parallel inner and outer surfaces each having a curvature transverse to said longitudinal edges, said curvatures corresponding to said number of wood staves and to the radius of said pipe-shaped body, providing each said longitudinal edge with a complementary tongue and groove pattern adapted to mate with the tongue and groove pattern of an adjacent stave, said pattern having a series of mutually undulating grooves and oppositely slanting and radially projecting tongues, coating said tongues and grooves with an adhesive, assembling said staves in a cradle-like mounting means, wherein the tongues and grooves of each stave are brought into direct perpendicular engagement with the tongues and grooves of an adjacent stave, the engagement of said staves together forming the pipe-shaped body, the final stave being brought into position by separating the second to last stave and its next adjacent stave until the space defined between them opens to receive the final stave and then firmly closes around said final stave, thereby completing the pipe-shaped body, clamping said assembled staves to stabilize the pipe-shaped body and allow the adhesive to cure, releasing said pipe-shaped body from clamping, working the internal and external surfaces of the pipe-shaped body, cutting at least one pair of cylindrical hollow bodies from the pipe-shaped body along a predetermined continuously arcuate and non-planar path to form at least one pair of furniture blanks, both blanks of said pair having a contoured edge of substantially the same shape in the vicinity of the cut, and finishing at least one of said blanks to provide a furniture product.

2. A method according to claim 1, wherein said tongues and grooves are V-shaped.

3. A method according to claim 1, wherein said tongues and grooves are U-shaped.

4. A method according to claim 1, wherein the adhesive is wood-binding glue.

5. A method according to claim 1, wherein the number of staves is thirty, the width of each stave is approximately 6.5 cm, and the length of each stave is from about 40 to 400 cm.

6. A method according to claim 1, wherein said working step includes at least one of milling, grinding and polishing.

7. A method according to claim 1, wherein said clamping step comprises placing air hoses around the outer circumference of the pipe-shaped body at spaced intervals and filling said hoses with air.

8. A method according to claim 1, wherein said clamping step comprises placing straps around the outer circumference of the pipe-shaped body at spaced intervals and tightening said straps.

9. A method according to claim 1, wherein said finishing step includes providing said blank with at least one of a cross-sectional support and a longitudinal support.

10. A method according to claim 9, wherein said blank has a back region, a seat region, and a shape suitable for a chair, and wherein at least one cross-sectional support comprises a seat placed within said seat region.

11. The method according to claim 9, wherein at least one cross-sectional support comprises a ring cut from a pipe-shaped body of wood, said ring first being split and having at least one stave or section of a stave removed to obtain an open flexible ring having a reduced diameter when compressed.

12. The method according to claim 1, wherein said providing step includes providing said longitudial edges with oppositely slanting edge portions which would converge at the center of the pipe-shaped body if extended along an imaginary line.

* * * * *